(12) United States Patent
Wang

(10) Patent No.: US 9,332,023 B1
(45) Date of Patent: May 3, 2016

(54) UPLOADING SIGNATURES TO GATEWAY LEVEL UNIFIED THREAT MANAGEMENT DEVICES AFTER ENDPOINT LEVEL BEHAVIOR BASED DETECTION OF ZERO DAY THREATS

(71) Applicant: Symantec Corporation, Mountain View, CA (US)

(72) Inventor: Pengchao Wang, Chengdu (CN)

( * ) Notice: Subject to any disclaimer, the term of this patent is extended or adjusted under 35 U.S.C. 154(b) by 144 days.

(21) Appl. No.: 14/467,259

(22) Filed: Aug. 25, 2014

(51) Int. Cl.
*G06F 15/16* (2006.01)
*H04L 29/06* (2006.01)

(52) U.S. Cl.
CPC ........ *H04L 63/1416* (2013.01); *H04L 63/0245* (2013.01); *H04L 63/145* (2013.01)

(58) Field of Classification Search
CPC . H04L 63/0281; H04L 63/0428; H04L 63/08; H04L 63/029; H04L 63/083
USPC ............................................... 726/12, 22–25
See application file for complete search history.

(56) References Cited

U.S. PATENT DOCUMENTS

| | | | |
|---|---|---|---|
| 8,695,096 B1 * | 4/2014 | Zhang | 726/24 |
| 2008/0016339 A1 * | 1/2008 | Shukla | 713/164 |
| 2012/0304244 A1 * | 11/2012 | Xie et al. | 726/1 |

* cited by examiner

*Primary Examiner* — Baotran N To
(74) *Attorney, Agent, or Firm* — Patent Law Works LLP

(57) ABSTRACT

Zero day threats are detected at gateway level and blocked from entering a network. A database containing signatures identifying malware is maintained at the gateway. Inbound network traffic is scanned using the signatures, and files containing malware are detected and blocked by the gateway. When a file is received by a given endpoint in the network, behavior based malware detection is used to determine whether the file contains a zero day threat. Whenever a file is adjudicated by an endpoint as containing a zero day threat, the endpoint generates an identifying signature, and transmits the signature to the gateway in real time. The gateway thus receives signatures identifying multiple zero day threats from multiple endpoints, and subsequently scans inbound network traffic for the received signatures. From that point, the gateway detects files containing the zero day threats, and blocks them from being routed to endpoints in the network.

20 Claims, 4 Drawing Sheets

Gateway Component 113

| | |
|---|---|
| Scanning Module | 401 |
| Signature Maintaining Module | 403 |
| Blocking Module | 405 |
| Routing Module | 407 |
| Signature Receiving Module | 409 |
| Signature Adding Module | 411 |

*FIG. 4A*

Endpoint Component 111

| | |
|---|---|
| Receiving Module | 413 |
| Behavior Based Detecting Module | 415 |
| File Running Module | 417 |
| Behavior Monitoring Module | 419 |
| Adjudicating Module | 421 |
| Signature Generating Module | 423 |
| Signature Transmitting Module | 425 |

*FIG. 4B*

UPLOADING SIGNATURES TO GATEWAY LEVEL UNIFIED THREAT MANAGEMENT DEVICES AFTER ENDPOINT LEVEL BEHAVIOR BASED DETECTION OF ZERO DAY THREATS

TECHNICAL FIELD

This disclosure pertains generally to computer security, and more specifically to uploading signatures to gateway level unified threat management devices after endpoint level behavior based detection of zero day threats.

BACKGROUND

Unified Threat Management (UTM) at a gateway level is a network security practice, which has gained widespread currency as a primary network gateway defense solution for enterprises and other organizations. UTM can be thought of as the evolution of the traditional firewall into an inclusive, gateway level security product able to perform multiple security functions within a single network appliance located at the gateway between the enterprise level (private) network and the Internet (or other public wide area network). These security functions can include network firewalling, network intrusion prevention and anti-malware scanning, anti-spam processing, virtual private network (VPN), content filtering, load balancing, data leak prevention and on-appliance reporting.

Anti-malware and intrusion prevention scanning functionality is typically included in a UTM system on a gateway level device. These systems detect and block network threats and malware such as viruses, worms and Trojans before they enter the enterprise network, by scanning incoming files in the data flow, and detecting known malware signatures in the files. As the term is used herein, a malware signature means a string of bits or binary pattern that identifies a known virus or other malware. It can be in the form of a hash (a number derived from a string of text), which in its simplest form, is a static calculated numerical value of a snippet of code unique to the malware. Malware signatures are sometimes also referred to as definitions or DAT files. Signature-based detection involves scanning files to detect malware signatures from a "dictionary" of known signatures. This can be effective, but cannot defend against malware unless samples have already been obtained and signatures created. Malware authors have tried to stay a step ahead of such scanning by writing viruses which encrypt parts of themselves or otherwise modify themselves as a method of disguise, so as to not match malware signatures in the dictionary.

In some cases, generic malware signatures can be created that identify variants by accounting for slight variations of known malicious code in files. For example, virus researchers can identify common areas that all versions of malware in a given family share, and create a single generic signature for that family of malware. Such generic signatures often contain non-contiguous code, using wildcard characters where differences are present between variations, thereby allowing the scanner to detect viruses even if they are padded with extra, meaningless code.

Signature based scanning by the UTM system can detect and block known viruses and other threats, which have already been identified, and for which a signature has already been created and supplied to the UTM system. This is effective against known threats for which a signature has already been created, but it is possible for computers to be attacked by new malware which has not yet been identified or analyzed, and is not similar enough to known malware to be identified by a generic signature. A zero-day threat (sometimes called zero-hour or day zero) is an attack that exploits a previously unknown vulnerability in a computer application, or is otherwise not known prior to the attack, such that developers and computer security professionals have not had time to create a signature of the malware, or otherwise address and patch the vulnerability. It is called a "zero-day threat" because there have been zero days to fix the flaw, and thus a signature or patch is not yet available.

Although zero day threats cannot be detected by scanning files for known malware signatures, the behavior of a program can be monitored with behavior based techniques to detect when the program executes activities or engages in behavior indicative of its being malware. However, because files do not run at the gateway level, but instead only once they have reached the target endpoint device (e.g., the client or server within the private network), UTM systems cannot analyze the behavior of the files, and thus cannot detect malicious or suspicious behavior to identify zero day threats such as a new malicious binary or shellcode. Instead, only an endpoint based anti-malware product can detect a virus or network threat by its behavior, because the programs only run on the endpoints.

For this reason, conventional security networking topology using UTM requires both the UTM system at the gateway level, to keep known threats out of the enterprise network altogether, and a separate, endpoint based anti-malware software program residing on each computer in the network, to perform behavior based detection so as to protect against zero day threats. In order to infect a computer, the malware or network threat payload must pass through the UTM system at the gateway level, which is the first battle line of the enterprise. However, because the UTM system is relying on existing signatures as explained above, it cannot detect zero day threats for which no signature is yet known. These threats therefore arrive at the target endpoint computer, where, it is hoped, they will be detected by endpoint behavior based anti-malware software, which is the second battle line. However, under this two battle line scenario, a zero day attacker could attempt to target multiple machines in the same network, hoping that at least one of the computer users neglected to install or maintain their local endpoint software. Even if the endpoint security software is installed on every targeted end point, each targeted machine still needs to detect the threat separately, based on the behavior of the file, and separately take protective action to neutralize the detected threat. Even if this is successful, it uses an abundance of computing resources at each separate computer on the network.

It would be desirable to address these issues.

SUMMARY

Zero day threats are detected at gateway level and blocked from entering a private network. The private network consists of a gateway device and multiple endpoint computers. In one embodiment, the gateway device can run a first operating system, while one or more of the endpoint computer(s) run(s) a second, different operating system. Different ones of the multiple endpoint computers can run two or more different operating systems. Regardless, the gateway device routes inbound and outbound network traffic to and from the endpoint computers of the private network. A database (or other storage mechanism) containing multiple signatures identifying known malware is maintained at the gateway device. Inbound network traffic is scanned using the multiple maintained signatures, and files containing known malware are detected in the inbound network traffic, by the gateway device. Detected files containing known malware are blocked from being routed to any endpoint computer in the private network, by the gateway device. During the course of routing inbound traffic to endpoint computers of the private network, sometimes a file containing a specific zero day threat is received, but the zero day threat is not detected by the gateway device. This is because no signature identifying the zero day threat is present in the collection of malware signatures at the time the zero day threat arrives at the gateway device in the inbound network traffic. As a result, the file containing the specific zero day threat is routed by the gateway device to a specific target endpoint computer in the private network.

When a file is received by a given endpoint computer in the private network from the gateway device, the endpoint computer can perform behavior based malware detection on the file, in order to determine whether the file is malicious or benign. Performing behavior based detection on a file can take the form of running the file on the endpoint computer, and monitoring the behavior of the file in real time as it runs, to determine whether the file attempts any behaviors indicative of maliciousness. For example, the file can be run in a sandbox on the endpoint computer, such that the sandbox provides controlled access to resources of the endpoint computer. Monitoring the behavior of the file as it runs on the endpoint computer can be implemented, for example, by intercepting system calls made by the file as it runs (e.g., hooking an Application Programming Interface (API) of the operating system of the endpoint computer). The monitoring of the file as it runs on the endpoint computer can be used to detect if the file attempts to execute behaviors or combinations of behaviors indicative of maliciousness, such as one or more of the following: opening, viewing, deleting, and/or modifying at least one system file, formatting a storage device, executing an unrecoverable disk operation, making a modification to logic of at least one executable file, script or macro, modifying start-up or other critical system settings, scripting of an e-mail or an instant messaging client to send executable content and initiating network communications.

When a file subject to behavior based detection by an endpoint computer contains a zero day threat, the endpoint computer can detect the threat using the behavior based analysis as described above, and adjudicate the file as being malicious. More specifically, a file can be adjudicated as containing a zero day threat in response to the file attempting one or more actions (for example, a specific combination of actions) indicative of maliciousness when the file runs on the endpoint computer. In some embodiments, different actions indicative of maliciousness can be assigned different weights, and a file can be adjudicated as containing a zero day threat after exceeding a given suspiciousness threshold, as a result of attempting specific weighted actions when running on the endpoint computer. Once a file is adjudicated as being a zero day threat, the endpoint computer automatically generates a signature identifying the zero day threat. The endpoint computer can programmatically generate the signature without human input or authoring, based on, e.g., at least one action taken by the file and/or content of the file, for example by creating an MD5 (or other) hash of the zero day threat.

Whenever any endpoint computer in the private network generates a signature identifying a zero day threat, the endpoint computer transmits the signature to the gateway device in real time. Thus, the gateway device receives signatures identifying multiple zero day threats from multiple ones of the endpoint computers in the private network. Each received signature identifying a zero day threat is added to the collection of signatures identifying malware maintained by the gateway device. Subsequently to adding a given received signature identifying a given zero day threat to the plurality of signatures maintained by the gateway device, inbound network traffic is scanned for the given received signature. The gateway device can thereby detect files containing the given zero day threat in the inbound network traffic, and block the detected files containing the given zero day threat from being routed to any endpoint computer in the private network.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 4A is a block diagram illustrating modules of a gateway component of a zero day threat management system, according to some embodiments.

FIG. 4B is a block diagram illustrating modules of an endpoint component of a zero day threat management system, according to some embodiments.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
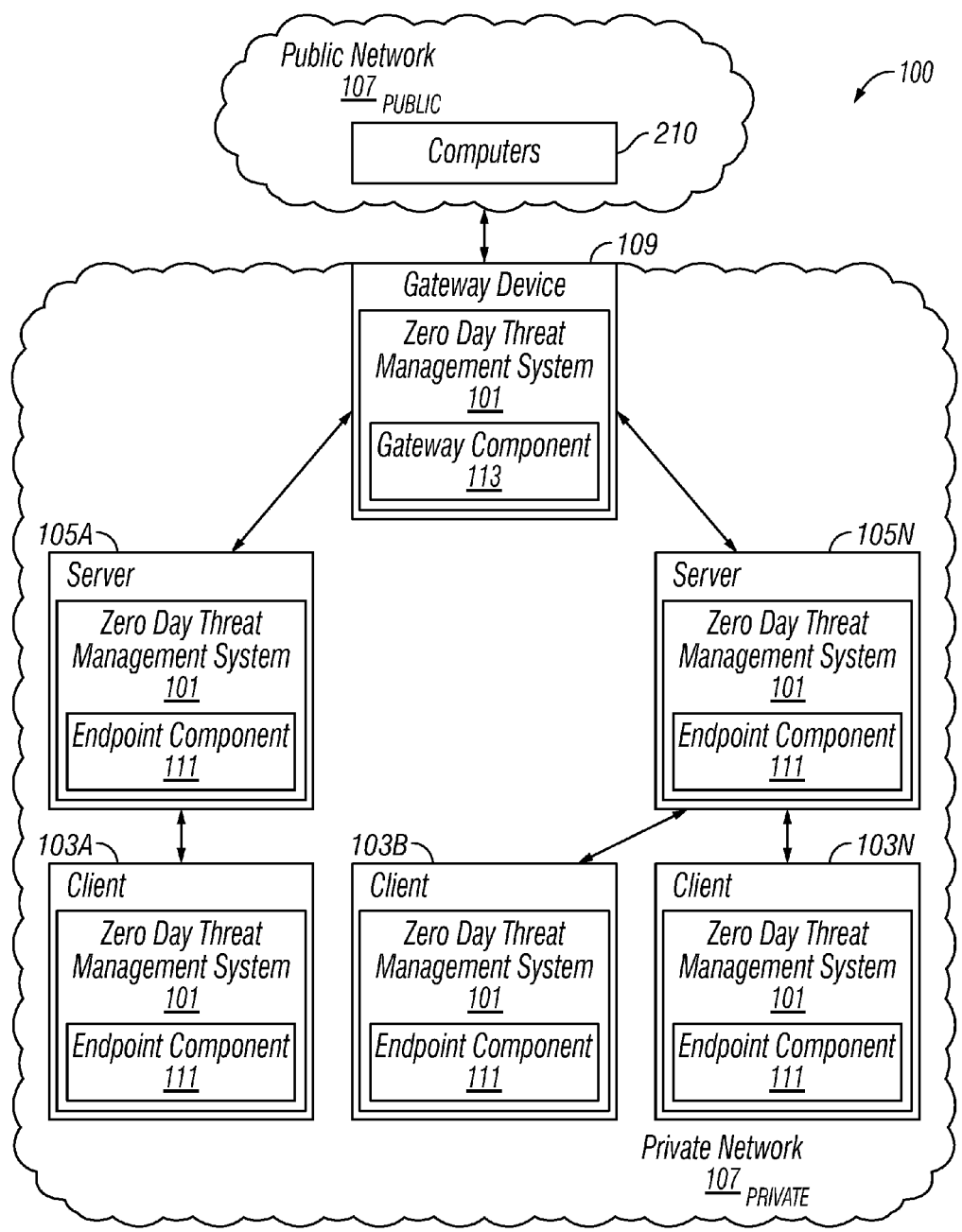
FIG. 1 is a block diagram of an exemplary network architecture in which a zero day threat management system can be implemented, according to some embodiments.

FIG. 1 is a block diagram illustrating an exemplary network architecture 100 in which a zero day threat management system 101 can be implemented. A public network $107_{PUBLIC}$ is communicatively coupled to a private network $107_{PRIVATE}$ via a gateway device 109 deployed as part of the private network $107_{PRIVATE}$. In one embodiment, public network $107_{PUBLIC}$ is in the form of the Internet 311, and private network $107_{PRIVATE}$ is in the form of a private enterprise level network. Other networks 107 or network-based environments can be used in other embodiments. As the term is used herein, a private network $107_{PRIVATE}$ means a network 107 maintained by any type of organization or individual (e.g., a corporation, a university, a government department, a municipality, a civic organization, a household), wherein access to the network is restricted according to policies set by an administrator. For example, typically only authorized users (e.g., employees, students, family members, etc.) are allowed to access the private network $107_{PRIVATE}$ although in some cases other users can login as guests, or certain resources of the private network $107_{PRIVATE}$ can be publically accessed.

The illustrated private network $107_{PRIVATE}$ comprises multiple clients 103A, 103B and 103N, as well as multiple servers 105A and 105N. Although FIG. 1 illustrates three clients 103 and two servers 105 as an example, in practice many more (or fewer) clients 103 and/or servers 105 can be deployed in the private network $107_{PRIVATE}$. The endpoint computers 210 present in the private network $107_{PRIVATE}$ can comprise any combination of desktop computers and/or mobile computing devices, acting in the capacity of clients 103 and/or servers 105 as desired.

In FIG. 1, a gateway component 113 of the zero day threat management system 101 is illustrated as residing on the gateway device 109. As used herein, a gateway device 109 means a component such as a router or proxy server that routes traffic between networks 107. In the illustrated example, inbound and outbound network traffic to and from the private network $107_{PRIVATE}$ is routed by the gateway device 109. FIG. 1 further illustrates an endpoint component 111 of the zero day threat management system 101 residing on each client 103 and on each server 105 in the private network $107_{PRIVATE}$. It is to be understood that this is an example only, and in various embodiments various functionalities of the zero day threat management system 101 can be instantiated on other types of computing devices 210, and be distributed between multiple computing devices (e.g., network appliances 109, clients 103 and/or servers 105).

Clients 103 and servers 105 can be implemented using computer systems 210 such as the one illustrated in FIG. 2 and described below. The clients 103 and servers 105 are communicatively coupled to the private network $107_{PRIVATE}$, for example via a network interface 248 or modem 247 as described below in conjunction with FIG. 2. All communication between the computers 210 in the private network $107_{PRIVATE}$ and computers 210 outside of the private network $107_{PRIVATE}$ (e.g., webservers 303 in the public network $107_{PUBLIC}$ (e.g., Internet 311), computers 210 in other enterprise level networks 107, etc.) passes through the gateway 109. Although the gateway 109 is illustrated as a single entity, in some embodiments the gateway 109 can be implemented using multiple hardware components.

Clients 103 are able to access applications and/or data on servers 105 using, for example, a web browser or other client software (not shown). Clients 103 can be in the form of desktop computers, laptop computers, or mobile computing devices, comprising portable computer systems capable of connecting to a network 107 and running applications. Such mobile computing devices are sometimes referred to as smartphones, although some mobile phones not so designated also have these capabilities. Tablet computers, laptop computers, hybrids, convertible laptops, smart watches and other types of wearable computing devices are all examples of mobile computing devices.

Figure 2:
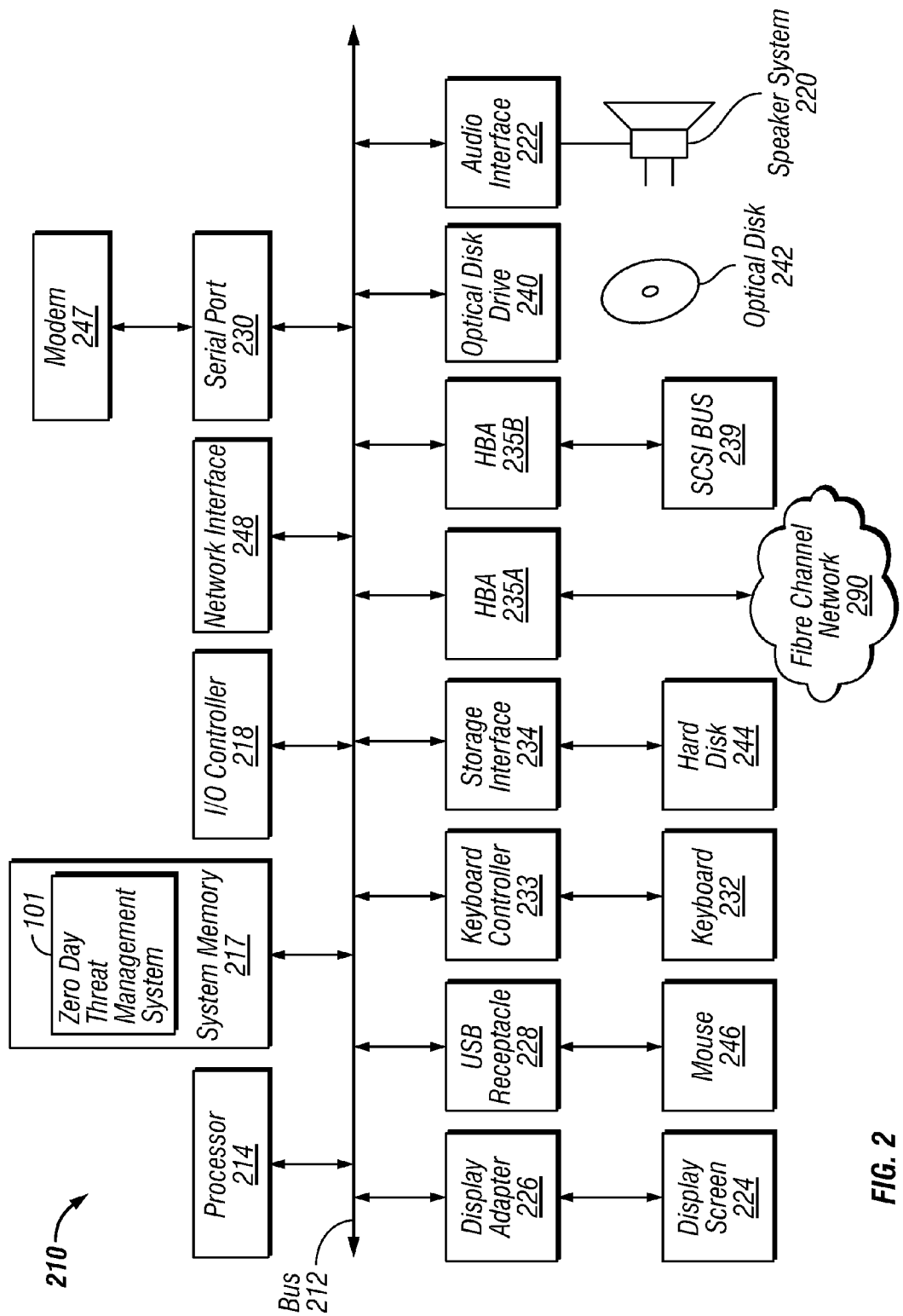
FIG. 2 is a block diagram of a computer system suitable for implementing a zero day threat management system, according to some embodiments.

FIG. 2 is a block diagram of a computer system 210 suitable for implementing a zero day threat management system 101. Clients 103, servers 105 and gateway devices 109 can be implemented in the form of such computer systems 210.

As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) receptacles 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB receptacle 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB receptacles 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the zero day threat management system 101 is illustrated as residing in system memory 217. The workings of the zero day threat management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the Internet 311. Such coupling can be wired or wireless.

Figure 3:
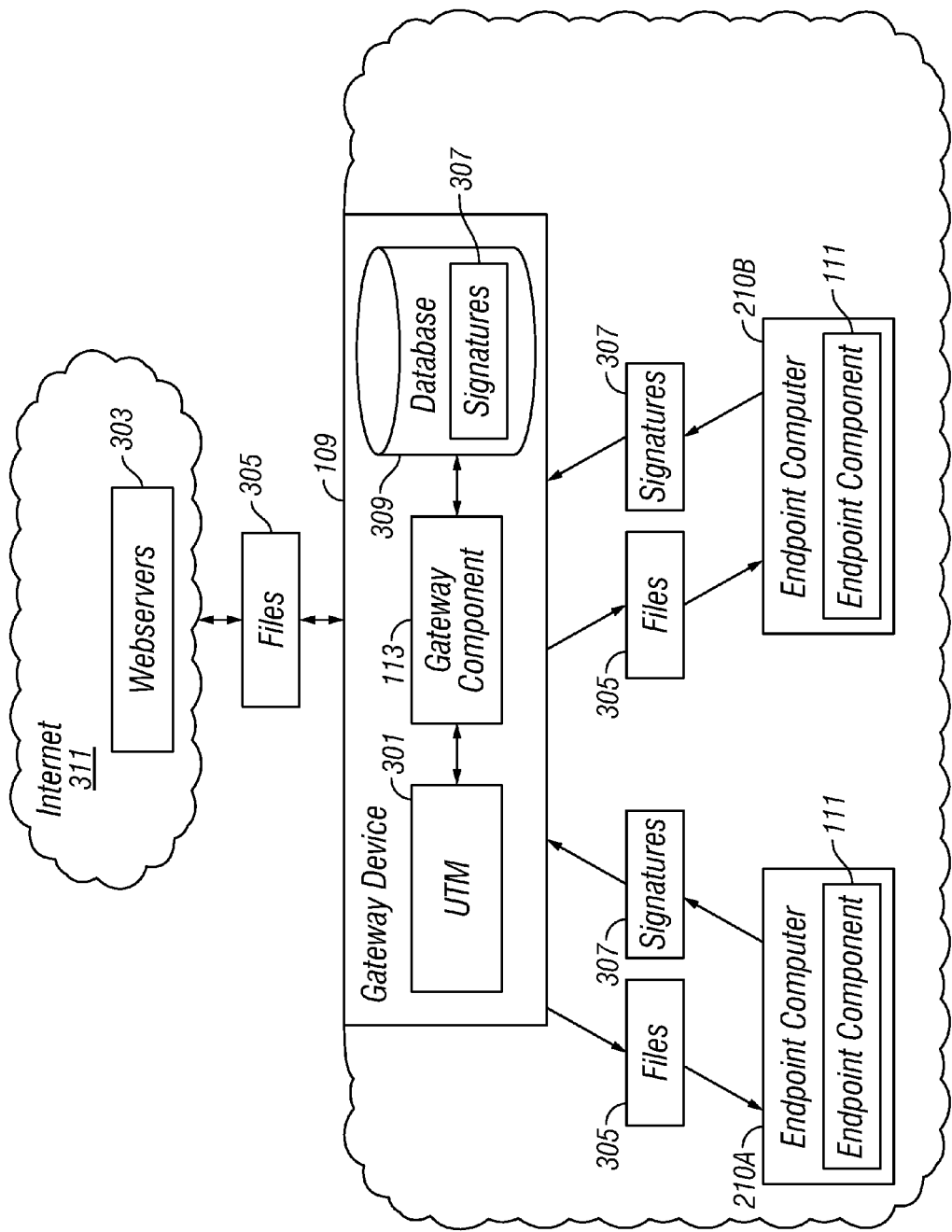
FIG. 3 is a block diagram of the operation of a zero day threat management system, according to some embodiments.

FIG. 3 illustrates the operation of a zero day threat management system 101, according to some embodiments. In FIG. 3, a gateway component 113 of the zero day threat management system 101 is illustrated as residing on the gateway 109, and running in conjunction with an endpoint component 111 of the zero day threat management system 101 running on each endpoint computer 210 in a private network $107_{PRIVATE}$. The private network $107_{PRIVATE}$ illustrated in FIG. 3 depicts only two endpoint computers 210, but in practice more endpoint computers 210 can be deployed, including orders of magnitude more. It is to be understood that the endpoint computers 210 can be in the form of servers 105 and/or clients 103, which in turn can be in the form of desktop or mobile computing devices as desired. As described above, the functionalities of the zero day threat management system 101 can reside on different types of computing devices 210, or be distributed between multiple computer systems 210, including within a cloud-based computing environment in which the functionality of the zero day threat management system 101 is provided as a service over a network 107. It is to be understood that although the gateway 113 and endpoint components 111 of the zero day threat management system 101 are illustrated in FIG. 3 as single entities, each of these components represents a collection of functionalities, which can be instantiated as a single or multiple modules as desired. A specific example of modules of a gateway component 113 of the zero day threat management system 101 is illustrated in FIG. 4A, and a specific example of modules of an endpoint component 111 of the zero day threat management system 101 is illustrated in FIG. 4B. In some embodiments, the modules of the zero day threat management system 101 can reside on different computing devices 210 as desired. It is to be understood that the modules of the zero day threat management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the zero day threat management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the gateway component 113 of the zero day threat management system 101 operates in conjunction with a UTM 301. Although the gateway component 113 of the zero day threat management system 101 and UTM 301 are illustrated as separate components, in some embodiments the gateway component 113 can be implemented as a component of a UTM 301, whereas in other embodiments the two entities can share some functionalities. An endpoint component 111 of the zero day threat management system 101 operates on each endpoint computer 210 in the private network $107_{PRIVATE}$.

FIG. 4A illustrates the modules of a gateway component 113 of the zero day threat management system 101, according to some embodiments. The operations of these modules are discussed in detail below in conjunction with FIG. 3. A scanning module 401 of the gateway component 113 of the zero day threat management system 101 is used to scan inbound network traffic at the gateway device 109 for malware signatures 307 of known malware. A signature maintaining module 403 of the gateway component 113 of the zero day threat management system 101 is used to maintain a plurality of known malware signatures 307 on the gateway device 109. A blocking module 405 of the gateway component 113 of the zero day threat management system 101 is used to block detected malware at the gateway device 109, before the detected malware can infect any of the endpoint computers 210 in the private network $107_{PRIVATE}$. A routing module 407 of the gateway component 113 of the zero day threat management system 101 is used to route unblocked inbound network traffic from the gateway device 109 to target endpoint computers 210 in the private network $107_{PRIVATE}$. A signature receiving module 409 of the gateway component 113 of the zero day threat management system 101 is used to receive signatures 307 of zero day threats generated by various ones of the plurality of endpoint computers 210 in the private network $107_{PRIVATE}$, based on endpoint level behavior based detection. Finally, a signature adding module 411 of the gateway component 113 of the zero day threat management system 101 adds the newly received signatures 307 to the plurality of known malware signatures 307 maintained on the gateway device 109. In other embodiments, the gateway component 113 of the zero day threat management system 101 can comprise more, fewer or different modules as desired.

FIG. 4B illustrates the modules of an endpoint component 111 of the zero day threat management system 101, according to some embodiments. As with FIG. 4A, the operations of the modules illustrated in FIG. 4B are discussed in detail below in conjunction with FIG. 3. A receiving module 413 of the endpoint component 111 of the zero day threat management system 101 is used receive non-blocked files 305 that are routed to the given endpoint computer 210 by the gateway device 109. A behavior based detecting module 415 of the endpoint component 111 of the zero day threat management system 101 is used to determine whether received files 305 are malicious or benign, by applying behavior based detection techniques. A file running module 417 of the endpoint component 111 of the zero day threat management system 101 is used to run received files 305 in a controlled manner on the given endpoint 210. A behavior monitoring module 419 of the endpoint component 111 of the zero day threat management system 101 is used to monitor behavior of the running files 305 in real time, to detect attempts to execute certain behaviors or combinations of behaviors indicative of maliciousness. An adjudicating module 421 of the endpoint component 111 of the zero day threat management system 101 is used to adjudicate monitored files 305 as being malicious or benign. A signature generating module 423 of the endpoint component 111 of the zero day threat management system 101 is used to automatically generate signatures 307 identifying any files 305 adjudicated to be the malware. Finally, a signature transmitting module 425 of the endpoint component 111 of the zero day threat management system 101 transmits generated malware signatures 307 from the endpoint computer 210 to the gateway device 109. In other embodiments, the endpoint component 111 of the zero day threat management system 101 can comprise more, fewer or different modules as desired.

Returning now to FIG. 3, the operation of a zero day threat management system 101 is described, according to some embodiments. The scanning module 401 of the gateway component 113 of the zero day threat management system 101 runs on the gateway device 109 and scans inbound network traffic for malware signatures 307 of known malware. The signature maintaining module 403 of the gateway component 113 of the zero day threat management system 101 can maintain a database 309 (or other storage mechanism) of known malware signatures 307 on the gateway device 109. The scanning module 401 uses these signatures 307 to scan files 305 in the inbound network traffic originating from outside the private network $107_{PRIVATE}$, e.g., from the Internet 311 as illustrated or from another private or public network 107 (not illustrated). However, this can have a significant negative impact on performance by slowing down network throughput and creating a bottleneck. In some embodiments, some of the inbound network traffic is not scanned, for example files 305 originating from trusted domains or trusted individual users. Which specific files 305 in the inbound network traffic to scan varies between embodiments. In one embodiment, the scanning module 401 scans all inbound traffic.

This scanning functionality detects known threats for which a signature 307 has already been created and distributed to the gateway device 109. The blocking module 405 of the gateway component 113 of the zero day threat management system 101 blocks these known threats at the gateway 109, before they can infect any of the endpoint computers 210. However, any viruses or other threats for which a signature 307 does not yet exist cannot be detected by scanning the inbound network traffic, and thus are not blocked at the gateway 109. As noted above and explained in more detail below, it is not practicable to perform behavior based malware detection at the gateway device 109, so any zero day threats or other unknown malware are not detected by the UTM 301 or gateway component 113 of the zero day threat management system 101. Therefore, the routing module 407 of the gateway component 113 of the zero day threat management system 101 routes them to the target endpoint computers 210 in the private network $107_{PRIVATE}$, in the course of normal routing of unblocked inbound network traffic.

On each endpoint computer 210 in the private network $107_{PRIVATE}$, the receiving module 413 of the endpoint component 111 of the zero day threat management system 101 receives non-blocked files 305 that are routed to the specific endpoint computer 210. As noted above, in some embodiments select inbound network traffic is trusted at a gateway level, for example files 305 from sources on a whitelist of trusted domains. Such files 305 are in effect adjudicated as being benign at the gateway level. However, files 210 that reach a given endpoint without having been specifically adjudicated as benign by the gateway component 113 of the zero day threat management system 101 are subject to behavior based testing at the endpoint 210. In some embodiments, no incoming files 305 are whitelisted at a gateway level, and thus there are no exemptions from endpoint level behavior based analysis. Regardless, when a runnable file 305 (e.g., a computer program in the form of an executable image, script, late binding object or other format that can be executed or interpreted in order to cause the computer 210 to perform instructions) reaches a given endpoint computer 210 in the private network $107_{PRIVATE}$, the behavior based detecting module 415 of the corresponding endpoint component 111 of the zero day threat management system 101 can use behavior based detection techniques to determine whether the file 305 is malicious or benign.

More specifically, the file running module 417 of the endpoint component 111 of the zero day threat management system 101 allows the file 305 to run in a controlled manner on the endpoint 210, so that it can be monitored. In some embodiments, the file 305 is run in a sandbox, which provides tightly controlled access to the endpoint's resources, such that the running program is given restricted or no access to non-virtualized critical resources on the endpoint 210. As described in more detail below, while the program runs, system calls (e.g., operating system native APIs) to perform actions of interest are intercepted or otherwise filtered. When attempts to execute malicious behaviors are detected, the actions are noted, and the attempts can be blocked and/or the execution of the program can be terminated.

The behavior monitoring module 419 of the endpoint component 111 of the zero day threat management system 101 monitors the behavior of the running file 305 in real time, to determine whether it attempts certain behaviors or combinations of behaviors considered indicative of maliciousness. The behavior monitoring module 419 intercepts or otherwise filters the system calls that can perform specific actions indicative of maliciousness, and monitors what the program is attempting to do. Which specific behaviors are considered indicative of a file 305 being malware can vary between embodiments, but examples include actions such as opening, viewing, deleting, and/or modifying system or other sensitive files, formatting disk drives or executing other unrecoverable disk operations, making modifications to the logic of executable files, scripts or macros, modifying start-up or other critical system settings, scripting of e-mail or instant messaging clients to send executable content and initiating network communications.

Based on the behavior of the file 305 when it runs, the adjudicating module 421 of the endpoint component 111 of the zero day threat management system 101 adjudicates the file 305 as being malicious or benign. In some embodiments, attempting a specific action or combination of actions results in the file 305 being adjudicated as malware. In some embodiments, different actions can be weighted differently, and a file 305 that exceeds a given suspiciousness threshold based on its actions is adjudicated as being malicious. The specific value to use as a threshold is a variable design parameter. In any case, behavior based detection is used to detect zero day threats at an endpoint level.

It is to be understood that it is not practicable for the UTM 301 or the gateway component 113 of the zero day threat management system 101 to utilize the above-described techniques to apply behavior based detection to files 305 in inbound network traffic at the gateway level for, a number of reasons. Using behavior based techniques to determine whether a program is malicious or benign involves actually running the program, and monitoring its behavior. The gateway device 109 frequently does not have the same operating system as some or all of the target endpoint computers 210 in the private network $107_{PRIVATE}$. For example, many current gateway devices 109 on which UTMs 301 are deployed are based on versions of Linux or UNIX, whereas endpoint computers 210 in a private network $107_{PRIVATE}$ often run a variety of other operating systems, such as Windows, MAC OS, Android, iOS, etc. For example, suppose the gateway device 109 is Linux based and the incoming network traffic includes a file 305 in the Portable Executable (PE) format, which is the Windows file format for executable content (e.g., executable images, object code, DLLs, etc.). In order to monitor and analyze the behavior of the PE file $305_{PE}$ to determine whether or not it is malicious, the PE file $305_{PE}$ has to be run under Windows, with the Windows specific system calls (e.g., Windows Native API) that perform the behaviors to be monitored being hooked or otherwise filtered. Yet, in this example the gateway device 109 is a Linux environment, not a Windows based computer 210. It is to be understood that a Linux based gateway device 109 and a PE file $305_{PE}$ targeted to a Windows based endpoint computer 210 is only one example of an incompatibility between the operating systems of the gateway 109 and endpoints 210 targeted by the incoming files 305. For example, the gateway 109 could be based on, e.g., Windows NT, and the incoming network traffic could include files 305 in the Executable and Linkable Format (ELF) format used by Linux, targeted to Linux based endpoint computers 210 (or, files 305 in the Mach Object (Mach-O) file format could be targeted to MAC OS based endpoints 210). The point is that the gateway device 109 runs a single operating system, and endpoint point computers 210 in the private network $107_{PRIVATE}$ can run one or more different operating systems, making it unfeasible to run incoming executable files 305 at the gateway 109. Even if files 305 in different operating system formats were to be run and monitored at the gateway 109 (e.g., in a plurality of emulators), this would utilize a great deal of computing resources at the gateway 109, causing a serious degradation of performance and creating a very significant bottleneck.

Once the adjudicating module 421 determines that a specific file 305 comprises malware (e.g., a zero day threat), the signature generating module 423 of the endpoint component 111 of the zero day threat management system 101 automatically generates a signature 307 identifying the malware. The signature 307 is created programmatically, without human input or authoring, based on the content of the malicious file 305 and/or its source and/or actions that it took. The signature 307 can include identifying information such as the file's MD5 (or other) hash (or checksum), the malicious payload's regular expression, the source IP address, TCP and/or UDP ports utilized, etc. The specific content of the signature 307 can vary based on the nature of the detected malware as well as between embodiments.

When the signature generating module 423 generates a signature 307 for a newly identified (e.g., zero day) threat, the signature transmitting module 425 of the endpoint component 111 of the zero day threat management system 101 transmits the signature 307 from the endpoint computer 210 to the gateway component 113 of the zero day threat management system 101 on the gateway device 109 in real time. Thus, whenever any endpoint computer 210 in the private network $107_{PRIVATE}$ detects a new (zero day) threat using behavior based detection, the endpoint 210 immediately generates a signature 307 for the newly identified malware, and shares the signature in real time with the security layer (e.g., the UTM 301 and gateway component 113 of the zero day threat management system 101) at the gateway level. As described below, the UTM 301 and gateway component 113 can subsequently detect any additional transmissions of the zero day threat in the inbound network traffic by scanning for the signature 307. This allows the zero day threat to be blocked at the gateway 109, after having been identified by a single endpoint 210 within the private network $107_{PRIVATE}$.

More specifically, the signature receiving module 409 of the gateway component 113 of the zero day threat management system 101 receives signatures 307 of zero day threats generated by the plurality of endpoint computers 210 in the private network $107_{PRIVATE}$. The signature adding module 411 of the gateway component 113 of the zero day threat management system 101 adds the newly received signatures 307 to the signature database 309 (or other storage mechanism) at the gateway 109 level. The scanning module 401 now scans files 305 in the inbound network traffic for the new signature 307, and therefore subsequently detects any additional instances of the zero day threat targeted to endpoint computers 210 in the private network $107_{PRIVATE}$. In other words, because the signature 307 of the zero day threat is now in the signature database 309, the zero day threat is detected at the gateway 109 by the gateway level scanning module 401. The blocking module 405 at the gateway level thus blocks the zero day threat from entering the private network $107_{PRIVATE}$.

The zero day threat management system 101 thus provides "detect once block many" functionality for zero day threats, in which a threat that is detected by behavior based analysis a single time on any endpoint 210 anywhere in the private network $107_{PRIVATE}$ is, from that moment forward, detected and blocked using signature based scanning at the gateway 109. Because the gateway component 113 of the zero day threat management system 101 receives and deploys all signatures 307 generated by endpoints 210 anywhere in private network $107_{PRIVATE}$, the security functionality at the gateway 109 can detect and block zero day threats, which conventionally can only be detected by endpoint 210 level behavior based analysis. The zero day threat management system 101 can prevent transmission of the zero day threat at a gateway 109 level, and thus protect the whole private network $107_{PRIVATE}$, whereas conventional gateway level security cannot protect against zero day threats at all, and conventional endpoint security can only protect a single computer 210. Thus, the zero day threat management system 101 creates significant improvements to the functioning of both the gateway device 109 and the endpoint computers 210.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for detecting zero day threats at a gateway level, and blocking zero day threats from entering a private network comprising a gateway device and a plurality of endpoint computers, the method comprising the steps of:

routing, by the gateway device, inbound and outbound network traffic to and from the private network;

maintaining, by the gateway device, a plurality of signatures identifying known malware;

scanning inbound network traffic for specific ones of the plurality of maintained signatures identifying known malware and detecting files containing known malware in the inbound network traffic, by the gateway device;

blocking the detected files containing known malware from being routed to any endpoint computer in the private network, by the gateway device;

receiving, by the gateway device, signatures identifying zero day threats from multiple ones of the plurality of endpoint computers in the private network;

wherein each specific received signature identifies a specific zero day threat routed in a specific file from the gateway device to a specific endpoint computer, as a result of a signature identifying the specific zero day threat not having been present in the plurality of signatures identifying malware maintained by the gateway device when the specific zero day threat arrived at the gateway device in inbound network traffic;

wherein each specific received signature having been generated by the specific endpoint computer to which the specific zero day threat was routed, responsive to the specific endpoint computer having adjudicated the specific file to comprise malware, as a result of the specific endpoint computer having performed behavior based malware detection on the specific file;

adding the signatures identifying zero day threats received from multiple ones of the plurality of endpoint computers to the plurality of signatures identifying malware maintained by the gateway device;

subsequently to adding a given received signature identifying a given zero day threat to the plurality of signatures identifying malware maintained by the gateway device, scanning inbound network traffic for the given received signature identifying the given zero day threat, the given received signature having been added to the plurality of maintained signatures, and detecting at least one file containing the given zero day threat, by the gateway device; and blocking the at least one file containing the given zero day threat from being routed to any endpoint computer in the private network, by the gateway device.

2. The method of claim 1 wherein the specific endpoint computer having adjudicated the specific file to comprise malware, as a result of the specific endpoint computer having performed behavior based malware detection on the specific file, further comprises:

the specific file having been run on the specific endpoint computer;

behavior of the specific file having been monitored in real time as the specific file ran on the specific endpoint computer; and based on the behavior of the specific file when it ran on the specific endpoint computer, the specific file having been adjudicated as being malicious.

3. The method of claim 2 wherein the specific file having been run on the specific endpoint computer further comprises:

the specific file having been run in a sandbox on the specific endpoint computer, the sandbox providing controlled access to resources of the endpoint computer.

4. The method of claim 2 wherein behavior of the specific file having been monitored in real time as the specific file ran on the specific endpoint computer further comprises:

having monitored behavior attempted by the specific file in real time as the specific file ran on the specific endpoint computer, thereby having determined whether the specific file attempted behaviors or combinations of behaviors indicative of maliciousness.

5. The method of claim 2 wherein behavior of the specific file having been monitored in real time as the specific file ran on the specific endpoint computer further comprises:

having monitored the specific file in real time as the specific file ran on the specific endpoint computer, to determine whether the specific file attempted at least one behavior indicative of maliciousness from a group of behaviors consisting of: opening, viewing, deleting, and/or modifying at least one system file, formatting a storage device, executing an unrecoverable disk operation, making a modification to logic of at least one executable file, script or macro, modifying start-up or other critical system settings, scripting of an e-mail or an instant messaging client to send executable content and initiating network communications.

6. The method of claim 2 wherein behavior of the specific file having been monitored in real time as the specific file ran on the specific endpoint computer further comprises:

having intercepted system calls made by the specific file as the specific file ran on the specific endpoint computer, thereby having monitored behavior attempted by the specific file indicative of maliciousness.

7. The method of claim 6 wherein having intercepted system calls further comprises:

having hooked an Application Programming Interface (API) of an operating system of the specific endpoint computer.

8. The method of claim 2 wherein the specific file having been adjudicated as being malicious further comprises:

the specific file having been adjudicated as being malicious by the specific endpoint computer, in response to the specific file having attempted at least one specific action indicative of maliciousness, as the specific file ran on the specific endpoint computer.

9. The method of claim 2 wherein the specific file having been adjudicated as being malicious further comprises:

the specific file having been adjudicated as being malicious by the specific endpoint computer, in response to the specific file having attempted a specific combination of actions indicative of maliciousness, as the specific file ran on the specific endpoint computer.

10. The method of claim 2 wherein the specific file having been adjudicated as being malicious further comprises:

the specific file having been adjudicated as being malicious by the specific endpoint computer, in response to the specific file having exceeded a given suspiciousness threshold, as a result of the specific file having attempted at least one of a plurality of actions indicative of maliciousness, each action of the plurality having an assigned weight.

11. The method of claim 1 wherein each specific received signature having been generated by the specific endpoint computer to which the specific zero day threat was routed further comprises:

at least one specific received signature having been created programmatically, without human input or authoring, by the specific endpoint computer, based on content of the specific file.

12. The method of claim 1 wherein each specific received signature having been generated by the specific endpoint computer to which the specific zero day threat was routed further comprises:

at least one specific received signature having been created programmatically, without human input or authoring, by the specific endpoint computer, based on at least one action taken by the specific file.

13. The method of claim 1 wherein receiving, by the gateway device, signatures identifying zero day threats from multiple ones of the plurality of endpoint computers in the private network further comprises:

receiving, by the endpoint computer, at least one signature comprising an MD5 hash of a zero day threat.

14. The method of claim 1 wherein:

the gateway device runs a first operating system and at least one endpoint computer in the private network runs a second, different operating system.

15. The method of claim 1 wherein:

different ones of the plurality of endpoint computers in the private network run at least two different operating systems.

16. A computer implemented method for detecting zero day threats at a gateway level, and blocking zero day threats from entering a private network comprising a gateway device and a plurality of endpoint computers, the method comprising the steps of:

receiving, by a specific endpoint computer in the private network from the gateway device, a file containing a specific zero day threat, the file containing the specific zero day threat having been routed by the gateway device to the specific endpoint computer as a result of a signature identifying the specific zero day threat not having been present in a plurality of signatures identifying malware maintained by the gateway device, when the specific zero day threat arrived at the gateway device in inbound network traffic;

wherein the gateway device runs a first operating system and the specific endpoint computer in the private network runs a second, different operating system;

performing behavior based malware detection on the file containing the specific zero day threat, in order to determine whether the file is malicious or benign, by the specific endpoint computer;

adjudicating the file containing the specific zero day threat to be malicious, based on the behavior based malware detection, by the specific endpoint computer;

automatically generating a signature identifying the specific zero day threat, by the specific endpoint computer;

transmitting the automatically generated signature identifying the specific zero day threat to the gateway device in realtime;

wherein the automatically generated signature identifying the specific zero day threat is added to the plurality of signatures identifying malware maintained by the gateway device;

wherein the gateway device subsequently receives inbound network traffic containing the specific zero day threat, scans the inbound network traffic for the received signature identifying the specific zero day threat, the received signature having been added to the plurality of maintained signatures, detects the specific zero day threat in the inbound network traffic, and blocks the specific zero day threat from being routed to any endpoint computer in the private network; and wherein the gateway device receives multiple automatically generated signatures identifying multiple zero day threats from multiple ones of the plurality of endpoint computers in the private network.

17. The method of claim 16 wherein performing behavior based malware detection on the file containing the specific zero day threat, in order to determine whether the file is malicious or benign, by the specific endpoint computer, further comprises:

running the file containing the specific zero day threat on the specific endpoint computer;

monitoring behavior of the specific file in real time as the specific file runs the specific endpoint computer; and determining that the file containing the specific zero day threat attempts at least one behavior indicative of maliciousness, as the file containing the specific zero day threat runs on the specific endpoint computer.

18. The method of claim 17 wherein determining that the file containing the specific zero day threat attempts at least one behavior indicative of maliciousness, as the file containing the specific zero day threat runs on the specific endpoint computer further comprises:

determining that the file containing the specific zero day threat attempts at least two behaviors indicative of maliciousness from a group of behaviors indicative of maliciousness consisting of: opening, viewing, deleting, and/or modifying at least one system file, formatting a storage device, executing an unrecoverable disk operation, making a modification to logic of at least one executable file, script or macro, modifying start-up or other critical system settings, scripting of an e-mail or an instant messaging client to send executable content and initiating network communications.

19. The method of claim 16 wherein automatically generating a signature identifying the specific zero day threat further comprises:

programmatically generating the signature identifying the specific zero day threat, without human input or authoring, by the specific endpoint computer.

20. At least one non-transitory computer readable-storage medium for detecting zero day threats at a gateway level, and blocking zero day threats from entering a private network comprising a gateway device and a plurality of endpoint computers, the at least one non-transitory computer readable-storage medium storing computer executable instructions that, when loaded into computer memory and executed by at least one processor of a computing device, cause the computing device to perform the following steps:

routing, by the gateway device, inbound and outbound network traffic to and from the private network;

maintaining, by the gateway device, a plurality of signatures identifying known malware;

scanning inbound network traffic for specific ones of the plurality of maintained signatures identifying known malware and detecting files containing known malware in the inbound network traffic, by the gateway device;

blocking the detected files containing known malware from being routed to any endpoint computer in the private network, by the gateway device;

receiving, by the gateway device, signatures identifying zero day threats from multiple ones of the plurality of endpoint computers in the private network;

wherein each specific received signature identifies a specific zero day threat routed in a specific file from the gateway device to a specific endpoint computer, as a result of a signature identifying the specific zero day threat not having been present in the plurality of signatures identifying malware maintained by the gateway device when the specific zero day threat arrived at the gateway device in inbound network traffic;

wherein each specific received signature having been generated by the specific endpoint computer to which the specific zero day threat was routed, responsive to the specific endpoint computer having adjudicated the specific file to comprise malware, as a result of the specific endpoint computer having performed behavior based malware detection on the specific file;

adding the signatures identifying zero day threats received from multiple ones of the plurality of endpoint computers to the plurality of signatures identifying malware maintained by the gateway device;

subsequently to adding a given received signature identifying a given zero day threat to the plurality of signatures identifying malware maintained by the gateway device, scanning inbound network traffic for the given received signature identifying the given zero day threat, the given received signature having been added to the plurality of maintained signatures, and detecting at least one file containing the given zero day threat, by the gateway device; and blocking the at least one file containing the given zero day threat from being routed to any endpoint computer in the private network, by the gateway device.

* * * * *